United States Patent [19]
Niemann

[11] 3,779,435
[45] Dec. 18, 1973

[54] UNIVERSAL LUGGAGE RACK FOR PLACEMENT ON CYCLES WITH WHEELS OF VARIOUS DIAMETERS, SUCH AS VARIOUS SIZE BICYCLES

[75] Inventor: Heinz Niemann, Heresford, Germany

[73] Assignee: ESGE-Marby GmbH & Co., near Bielefeld, Germany

[22] Filed: Jan. 11, 1972

[21] Appl. No.: 217,066

[30] Foreign Application Priority Data
Jan. 13, 1971  Germany .................. G 71 01 034.9

[52] U.S. Cl. ............................... 224/37, 224/32 A
[51] Int. Cl. ................................................ B62j 7/04
[58] Field of Search .................... 224/37, 38, 32 R, 224/39 R

[56] References Cited
UNITED STATES PATENTS
3,300,110   1/1967   Zurmühlen ........................ 224/39

FOREIGN PATENTS OR APPLICATIONS
163,634   4/1953   Sweden ............................... 224/38
502,772   5/1951   Belgium .............................. 224/37
194,065   3/1923   Great Britain .................... 224/39 R
638,917   11/1936   Germany .......................... 224/39 R
583,841   10/1958   Italy .................................. 224/37

Primary Examiner—Gerald M. Forlenza
Assistant Examiner—Jerold M. Forsberg
Attorney—Robert D. Flynn et al.

[57] ABSTRACT

A frame forms a luggage support plane, the frame being formed either by parallel longitudinal bars, plastic walls or the like; one end of this support surface is adapted for attachment to the rear fork of a bicycle, the other end being formed with a downwardly extending projection. Support arms adapted to be attached at, or adjacent the axle of the rear wheels are hinged below the plane forming the support surface, at the downwardly extending projection, in such a manner and by such a distance that the arc described by the attachment end of the support arms, upon rotation or swinging movement over the hinge points, describes a circle which essentially includes the connection points for the luggage carriers of cycles made for various wheel diameters, while permitting folding of the arms into the carrier for transport when removed from a cycle.

5 Claims, 6 Drawing Figures

UNIVERSAL LUGGAGE RACK FOR PLACEMENT ON CYCLES WITH WHEELS OF VARIOUS DIAMETERS, SUCH AS VARIOUS SIZE BICYCLES

CROSS REFERENCE TO RELATED PATENTS

U.S. Pat. Nos. 3,406,885 and 3,616,977.

The present invention relates to a luggage carrier for cycles and more particularly to a luggage carrier for bicycles, tricycles, motorcycles, and the like, which is universally useful for various sizes of cycles, that is, for cycles having various sizes of wheels.

Luggage carriers of the type described, for example, in U.S. Pat. No. 3,406,885, assigned to the assignee of the present invention, utilize a frame, the rear end of which is connected to a pair of arms which are adapted for connection to, or near the axle of the rear wheel of the cycle. The other end of the carrier, which forms a support surface, is adapted for connection to the rear fork, or to the frame of the cycle.

Luggage carriers for bicycles and the like are usually not universally useful for bicycles of various wheel diameters, primarily because the length of the support arms, adapted for attachment to, or near the rear axle of the cycle, must be made to match the wheel diameter over which the carrier is to be mounted. Some adjustment is possible by making the arms long enough to fit the largest cycle wheel, and punching a series of holes therein, for use as desired. This, however, is wasteful of material and weakens the arms when they are to be used with cycles having maximum wheel diameter.

It is an object of the present invention to provide a carrier for cycles which can be used with cycles of various wheel diameters without special adaptation to any specific cycle.

SUBJECT MATTER OF THE PRESENT INVENTION

Briefly, the hinge joint of the support arms for the cycle carrier is located substantially beneath the support surface of the cycle carrier, by a distance which is so selected that the free ends of the support arms, when swung over the hinge point, form an arc which includes essentially the attachment points of the cycle carriers of cycles of various wheel diameter. The cycle carrier itself, preferably, is formed of a frame. If the frame is of metal rods, then the terminal portions can be depressed and the arms secured to the depressed ends thereof; if the frame is sheet-like, for example of plastic, then the side walls of the frame can be brought downwardly, the attachment arms being hinged at the downward projections of the side walls. The forward end, when the cycle carrier is to be used over the rear wheel of a bicycle, is adapted for attachment to the frame, or rear fork of a bicycle; preferably it is bent upwardly in a U-shape, to form a forward bearing surface for objects carried on the cycle carrier.

Depressing the terminal portion of the cycle carrier, so that the hinge of the support arms will not be at, or immediately adjacent the support planes, permits utilization of the same type of cycle carrier with cycles of various wheel diameters. The free ends of the support arms will then match the respective position of the attachment point for the carrier of various cycles, as determined by the wheel diameters of these cycles.

The invention will be described by way of example with reference to the accompanying drawings, wherein.

Figure 1:
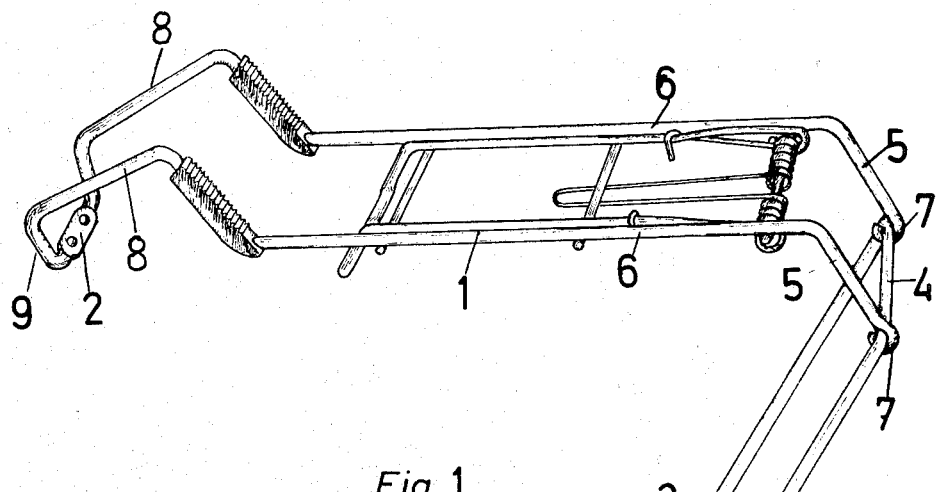
FIG. 1 is a general perspective view of a cycle carrier in accordance with the present invention.
Figure 1:
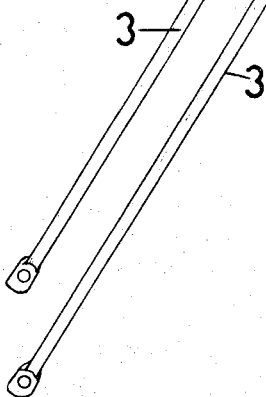

Frame 1 (FIGS. 1,2,3) of the cycle carrier is connected by means of a cross piece 2 to the rear fork 3' of a bicycle. The other end of the elongated cycle carrier is connected to a pair of support arms 3, 3, which are adapted for connection to a support point 10 on the bicycle. The terminal ends 5 of the longitudinal rods 6, defining the support surface form downwardly extending projections and are hooked over to form eyelets 7, in which the cross piece 4, interconnecting arms 3, 3 is swingably located.

Figures 3, 3A:
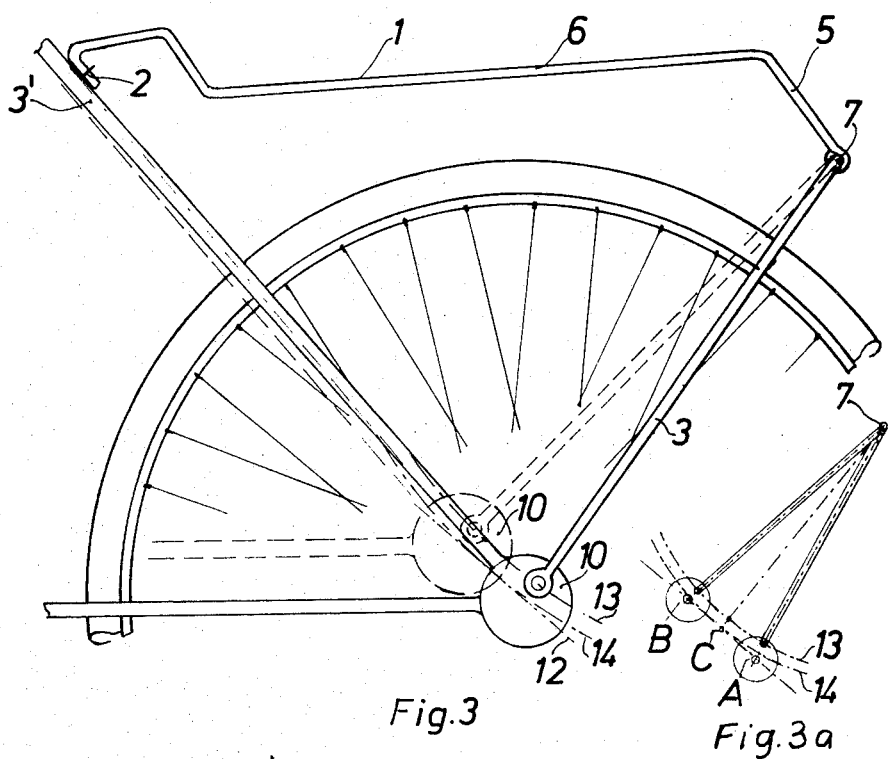
FIG. 3 is a schematic view of the attachment of a cycle barrier to a bicycle of large wheel diameter, in full lines, and to a bicycle of smaller wheel diameter, illustrated in broken lines.
FIG. 3a is a schematic showing of positional relationship.

FIG. 3 illustrates the adaptation of the cycle carrier to bicycles of various wheel size. The full line position of the cycle carrier, and of the fragmentary representation of the bicycle illustrates a bicycle of a given wheel diameter. If the wheel diameter should change, the position of the axle of the wheel moves towards the top of the bicycle along line 12, which is upwardly inclined towards the saddle of the bicycle. The attachment element 10 on the bicycle itself shifts similarly, as indicated in the broken line illustration. It is evident that due to the offset position of the hinge joint formed by eyelets 7, below the support surface of the bicycle carrier, the free ends, that is, the attachment ends of arms 3, will move in an arc 13 which approximates the line parallel to line 12 and which essentially includes all attachment points, regardless of size of wheel of a bicycle, so that the arms 3 can be attached to the attachment portions 10 with only very minor changes of inclination of the support surface defined by rods or bars 6. If it is considered that the axle, or shaft position of the wheel of largest diameter is at a point A (FIG. 3) and the shaft of a wheel of smallest diameter is at a point B, point C being roughly intermediate the line A-B, then the joint formed by eyelet 7 is preferably so positioned that it is at a direction perpendicular to the chord A-B and passing through point C. The arc 13, defined by the ends of arms 3 is then parallel to an arc 14 which is tangent to line 12 at point C. The difference in position between the straight line 12 and the arc 14 is so small that the resulting inclination, in the one direction or the other of the support surface is minimal.

Figure 2:
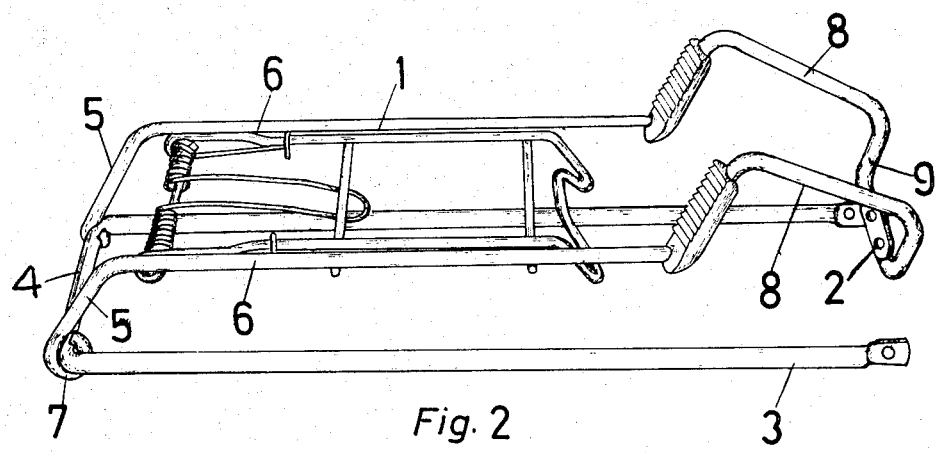
FIG. 2 is a view, looked at from the other side, in perspective of the carrier of FIG. 1, when folded.
Figure 2:
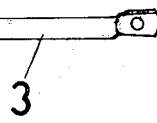

The carrier of FIGS. 1 and 2 is constructed in accordance with this principle; the arms 3, interconnected by the upper cross element 4 are hinged at eyelets 7, formed at the offset, bent downwardly terminal portions 5 of longitudinal rods or bars 6. A spring holddown clip is provided, as well known in the art, and need not be described further. The cross piece 4 provides a convenient handle to carry the carrier when it is folded together (as seen in FIG. 2), or to handle the cycle on which it is mounted, for example to transport a bicycle over a stairway. Cross element 4 can also be utilized to apply plates thereon, such as insurance plates, licenses, or the like, and can further be used to apply reflector or other decorative or safety elements.

The forward, or frame end of the carrier is bent into an upwardly extending projection which is bent over backward to form a general U-shaped end 8, to form a counter bearing surface for articles carried on the cycle carrier. The second leg portion of the U-shaped end portion is then interconnected with the terminal part 2 for connection with a clamp for clamping on the frame of the cycle. The entire carrier can thus be formed of continuous wire or rod shaped elements, bent in a suitable manner, and flattened, as at 2, to provide a support or bearing surface. The space beneath the U-shaped end 8 is free to permit brakes, or other control equipment, such as generators, to be mounted on the rear frame carriers of the cycle. The simplicity of manufacture of this carrier will be clear: one element is formed of a general bail-shaped portion forming arms 3 and cross piece 4; the other is a profiled wire structure having at its rear terminal element eyelets 7, merging into depending portions 5, support portions 6 and the forward terminal part having the U-shaped rise 8, legs 9 and cross piece 2. The pivoting connection of the cross piece 4 through eyelet 7 is particularly suitable for ease of manufacture and assembly and permits adaptation not only to close the carrier for shipment (FIG. 2) but also to adapt the carrier to cycles of various wheel diameters.

Figure 4:
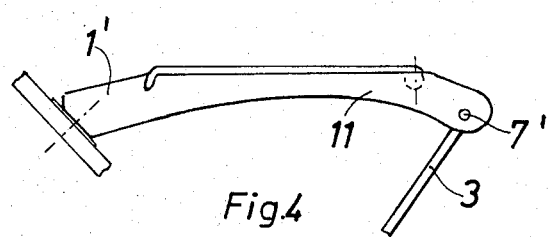
FIG. 4 is a side view of another embodiment of a cycle carrier.
Figure 5:
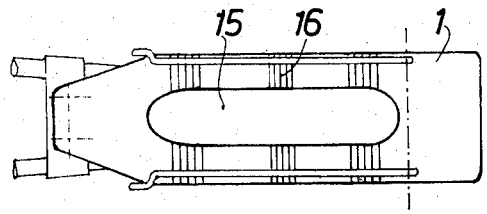
FIG. 5 is a top view of the carrier of FIG. 4.

Carriers can be made not only of wire profiled shapes but also of different materials. FIGS. 4 and 5 illustrate, to a reduced scale, a carrier having a frame 1' made of plastic. The legs 3 of the carrier are hinged through eyelets 7' formed in depending side walls 11 of the plastic carrier. The support surface of the plastic carrier is preferably formed to have a central opening 15 (FIG. 5) to save material and to permit carrying of objects which are not flat on one surface; the remaining carrying surface is ribbed, as seen at 16, at least in part, to provide a better grip for objects to be carried on the carrier. Arms 3 again can have a cross element 4, or can terminate at the eyelets 7' formed in the depending portion, being secured through the eyelet, for example, by a C-ring, a push nut or the like. The region of the sidewalls surrounding eyelets 7' may be reinforced, as desired. A line connecting the hinge 7, or 7', with the end of the support surface will form an obtuse angle therewith.

Various changes and modifications may be made within the inventive concept.

I claim:

1. Carrier rack adapted for placement over the wheel of a cycle, such as bicycles and the like, comprising
    means (1, 6) forming an elongated support plane for objects to be carried on the carrier and adapted for placement over the top of a wheel of the cycle;
    means (2) securing one end of the plane-forming means to the frame of the cycle;
    angled-off depending portions (5) formed at the other end of the plane-forming means and forming, with said plane-forming means, an obtuse angle;
    and support arms (3) formed as a unitary bail having an interconnecting portion (4) at said one end of the arms hinged adjacent a lower terminal portion of said depending portion (5), the other end of the arms being adapted for connection at a position adjacent the axle of the wheel of the cycle, the offset of the depending portion, and hence the hinge point (7) of said support arms (3) being located below the plane forming said support plane by a distance such that the arc described by said other end of the arms, upon swinging movement about said hinge points, essentially includes the connection points at the axles of cycles having wheels of different diameters.

2. Rack according to claim 1, wherein the depending terminal portions (5) of the longitudinal bars (6) are hooked to form eyelets (7), the interconnecting portions (4) of the arms (3) being passed through the eyelets and hinged therein.

3. Rack according to claim 1, wherein the means forming said support plane comprises
    a longitudinal frame having depending side walls (11), the arms being hinged to the depending side walls at a lower portion thereof.

4. Rack according to claim 3, wherein the means forming the support plane and the depending walls are a unitary element.

5. Rack according to claim 4, wherein the unitary elements forming the side walls and the support plane are of plastic material.

* * * * *